(No Model.)
W. WENZEL.
GALVANIC ELEMENT.
No. 300,176. Patented June 10, 1884.
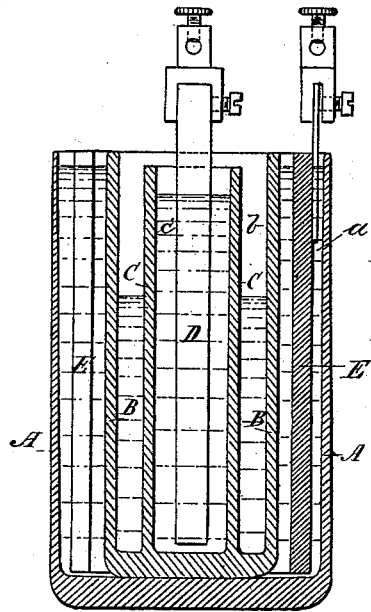
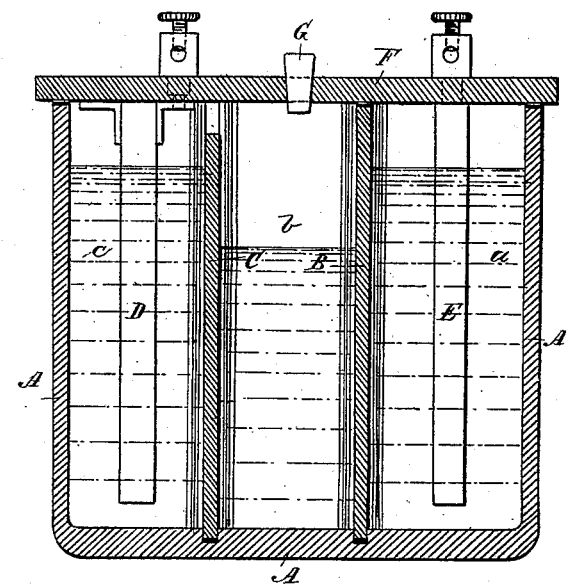
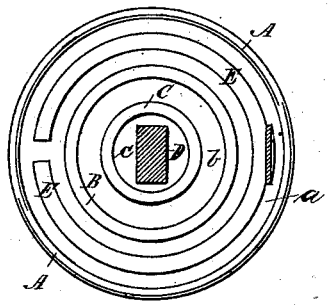
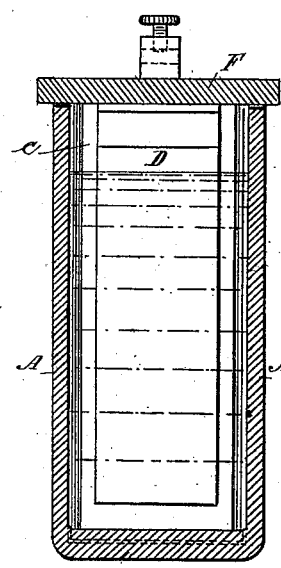
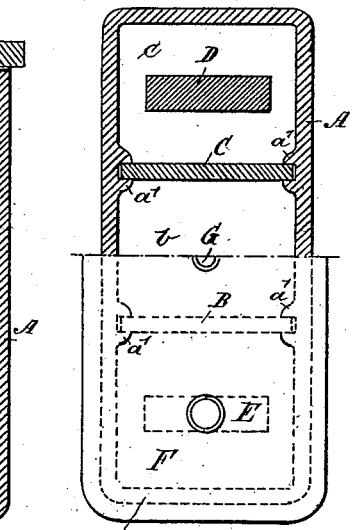
Witnesses
W. C. Poulter
G. W. Knotts
Inventor
Wilhelm Wenzel

UNITED STATES PATENT OFFICE.

WILHELM WENZEL, OF VIENNA, AUSTRIA-HUNGARY.

GALVANIC ELEMENT.

SPECIFICATION forming part of Letters Patent No. 300,176, dated June 10, 1884.

Application filed November 23, 1883. (No model.) Patented in France November 5, 1883, No. 158,380; in Belgium November 5, 1883, No. 63,104, and in Italy December 31, 1883, XVII, 16,085, XXXII, 68.

*To all whom it may concern:*

Be it known that I, WILHELM WENZEL, a subject of the Emperor of Austria-Hungary, residing at Vienna, in the Province of Nether Austria, in the Empire of Austria-Hungary, have invented certain new and useful Improvements in Galvanic Elements; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The new galvanic element forming the object of the present invention is represented in the annexed drawings, in which—

Figure 1 represents a vertical section of the improved element constructed in a cylindrical shape. Fig. 2 is a sectional top plan view of the same. Fig. 3 is a vertical longitudinal section of an element of a rectangular shape. Fig. 4 is a transverse section, and Fig. 5 a sectional top plan view, of the same.

In each case the galvanic element is composed of two metallic electrodes, or of two electrodes, one of which may be of metal and the other of a mineral substance, and of three conducting-liquids. These are placed in a vessel divided into three compartments or cells, $a$ $b$ $c$, by means of two diaphragms or partitions, B and C. The positive electrode, made either of platinum, carbon, or silver, is placed in the cell $c$ of the element, containing nitric acid of from 30° to 40° Baumé. The negative electrode is placed in the cell $a$, containing a solution of one part, by weight, of common salt in about twenty parts, by weight, of water; or it may contain an alkaline solution. The third compartment or cell, $b$, of the element is separated from the other cells by a porous diaphragm made of clay or other porous substance, and contains a concentrated solution of sulphuric acid of from 50° to 70° Baumé. It is obvious that this arrangement, as well as the form of the cells of the element, may be varied. The elements may have a cylindrical shape, or a polygonal form in cross-section; or they may be of any other convenient form, and the diaphragms may be arranged one within the other, to form concentric cells, or one by the side of the other, to form rectangular cells.

The element represented by Figs. 1 and 2 is composed of concentric cells $a$ $b$ $c$, formed by cylindrical concentric partitions or diaphragms B and C, which may be made of one piece. These are placed concentrically in the vessel A, which is preferably made of glass, though it may be made of any other suitable substance. In the compartment or cell $c$, filled with nitric acid, is placed the positive electrode D, made of platinum or of carbon. The cell $b$ is filled to a little above its medial line with sulphuric acid, so as to leave space enough for the increase of the volume of the liquid by the admixture therewith of nitric acid from cell $c$ and of water from cell $a$. The cell $a$ contains, preferably, a solution of common salt or some alkaline solution, or a diluted solution of some vegetable or mineral acid. In this liquid is immersed the negative electrode E, preferably of zinc. This arrangement may of course be modified in various ways. For instance, the negative electrode E may be placed in cell $c$, and the positive electrode D in cell $a$; or the positive electrode may be placed in cell $b$, and the negative electrode in cell $a$, the sulphuric acid being then contained in cell $c$; or the sulphuric acid may be introduced into cell $a$, and the positive electrode and the nitric acid into cell $b$, the negative electrode and the saline solution being introduced into cell $c$.

In either of the described arrangements the diaphragm separating the nitric-acid cell from the sulphuric-acid cell should not extend as high up as the other diaphragm, and if made as high it should be provided with notches or perforations at or near its upper edge. The object of this arrangement is to allow the mixture of both acids to overflow into the cell of the positive electrode when the level of the sulphuric acid is rising and that of the nitric acid is falling by reason of the absorption of the nitric acid by the sulphuric acid through the porous partition. By this arrangement the positive electrode will remain constantly immersed to a sufficient height in acid, whereby the constancy of the element and the duration of its working are considerably increased.

When the arrangement of the partitions or diaphragms is a non-concentric one—that is to say, when the several cells are arranged successively or side by side—the form of element shown in Figs. 3, 4, and 5 will be found of great advantage. In these figures the parts of the element that correspond with those of the element shown in Figs. 1 and 2 are designated by the same letters. Thus the polygonal-shaped vessel A is divided into three cells, *a b c*, by the two diaphragms B and C, cemented into the grooves *a'*, formed in the opposite walls of vessel A, or made fluid-tight therein by means of any other suitable packing medium, and to divide said vessel A into compartments, as set forth, the compartment or cell *b* being smaller than those *a c*, these latter being of an equal size, the sulphuric acid being preferably placed in the smaller compartment *b*. The compartment or cell *c* contains nitric acid, in which the positive electrode D is immersed, the compartment or cell *b* containing sulphuric acid, and cell *a* the saline solution, in which the negative electrode E is immersed. This arrangement may, however, be modified, as above described, without affecting the working of the element—as, for instance, the middle or smaller cell, *b*, may be filled with nitric acid instead of sulphuric acid, or with the saline solution, &c. The diaphragm which separates the nitric-acid cell from the sulphuric-acid cell should, according to this arrangement of the element, be made somewhat lower than the other diaphragm, or be perforated in its upper portion, so as to allow the sulphuric acid to overflow into the cell containing the positive electrode as soon as the level of the sulphuric acid has risen to the top of the separating-diaphragm, and the level of the nitric acid has correspondingly lowered, said changes of level being due to the osmose of the nitric acid through the porous diaphragm into the sulphuric acid.

The working of the improved element having the described arrangement is based upon very energetic chemical and electrolytical processes. These processes are going on in the following manner: Oxygen, water, and nitrous vapors are developed by the combination or contact of the exciting agents of the negative and positive electrodes while the sulphuric acid contained in the adjoining cell of the element is absorbing through the porous diaphragm the free water of the nitric acid, as well as a part of the diluted nitric acid, forming in this cell a mixture of sulphuric acid and nitric acid with some oxygen and water. The oxygen is liberated and the absorbed water dilutes to a still greater extent the sulphuric acid, the volume of the sulphuric-acid solution increasing as long as the chemical reaction goes on. It is obvious, therefore, that the quantity of sulphuric acid originally introduced into the element should be so proportioned that on absorbing a considerable portion of water and nitric acid percolating through the porous diaphragm of the cells containing the two acids, and an additional quantity of water percolating through the diaphragm which forms the sulphuric-acid cell and the cell that contains the negative electrode, the acid solution will rise to a sufficient height to overflow into the cell of the positive electrode, to maintain the volume of acid in this compartment practically constant. On the other hand, the sulphuric acid is dialyzing into the cell containing the solution of common salt or other alkaline solution, whereby the negative electrode immersed in said solution becomes surrounded with sulphate of soda, a portion of the liberated chlorine combining partly with the zinc to form chloride of zinc, and the other portion escaping in a gaseous state.

It is obvious that the working of an element of the described arrangement will evolve gases the escape of which is undesirable when the element is used for domestic purposes. To prevent this escapement of the gases I provide means whereby said element may be hermetically closed, and in Figs. 3, 4, and 5 I have shown the vessel A provided with a cover, F, said cover being made of any suitable substance and hermetically cemented or screwed upon the top of the vessel, the electrodes D E passing through and projecting above the cover. It will be seen that by this arrangement the vessel is tightly closed; but should the pressure of the gases generated within the vessel become greater than the power of resistance, the vessel A would burst. To avoid this danger the cover of said vessel is provided with a plug, G, or a check-valve or stop-cock, which opens, automatically or otherwise, as soon as the pressure of the gases exceeds a certain limit, and a portion of said gases will then escape from the vessel. If a battery is employed composed of a number of such elements, these may be arranged upon a single support or base-plate and covered by a single cover, in which the electrodes of all the elements are secured, their upper ends extending outward a short distance above said cover. Between the cover and the upper edges of each element is placed a suitable packing, and said cover is secured to the base-plate by means of screw-bolts of suitable length, whereby the packing may be tightened to seal each element hermetically. The confined gases and vapors developed during the working of the described element will partly condense when the pressure is sufficiently great, and will therefore escape only from time to time through the periodical opening of the plug or valve G. The chemical process taking place at the negative (zinc) electrode will of course vary according to the nature of the alkaline solution or of the diluted acid in which it is immersed. A galvanic element of the described arrangement will give a very constant current of great strength and intensity.

Of course it will be understood that instead of the plug G a stop-cock may be employed, and the gases allowed to escape by periodically opening the same; or a check-valve regulated to open automatically when the pressure of the gases has reached a given limit may be employed, and the latter arrangement will be preferred.

Having thus fully described my invention, what I claim, and desire to secure by Letters Patent of the United States, is—

1. A galvanic element the negative electrode of which (of zinc) is contained in a dialyzing-cell and immersed in an alkaline solution or its specified equivalent, in combination with a positive electrode (of platinum or carbon) immersed in a strong acid (nitric acid of from 30° to 40° Baumé) and contained in a second porous cell, and a conducting-liquid (sulphuric acid of from 50° to 70° Baumé) to electrically connect the electrodes through the medium of the constant osmotic exchange between the sulphuric and the nitric acid, substantially as described.

2. A galvanic element composed of a non-porous vessel divided into three cells by means of porous partitions, suitable electrodes and exciting agents therefor, and an intermediate conducting-liquid, the porous partition separating the intermediate conducting-liquid from the exciting agents being constructed to permit an overflow of the conducting-liquid into the cell containing the positive electrode and its exciting agent, substantially as described, and for the purpose specified.

In testimony whereof I affix my signature in presence of two witnesses.

WILHELM WENZEL.

Witnesses:
ERNST HOFMANN,
CLARENCE M. HYDE.